DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 2, 1976

944 O.G. 41

T944,006

MAGNESIUM BASE DIE CASTING ALLOY

Sidney L. Couling, Columbus, Ohio, assignor to The Dow Chemical Company, Midland, Mich.

Filed Dec. 5, 1974, Ser. No. 529,885
Int. Cl. C22c *23/02*
U.S. Cl. 75—168 B
No Drawing. 4 Pages Specification A magnesium base alloy suitable for use in high pressure die casting containing by weight from about 0.2 to about 3 percent aluminum, greater than 1.5 up to about 2 percent silicon and optionally up to about 2 percent manganese and up to about 1 percent zinc. The die cast article has improved corrosion and creep resistance over similar, low silicon content, die casting alloys of the prior art.